Sept. 5, 1933.  C. F. SCHULTIS  1,925,937
PIPE COUPLING
Filed Dec. 9, 1930

INVENTOR
Charles F. Schultis
BY Frank S. Greene
ATTORNEY

Patented Sept. 5, 1933

1,925,937

UNITED STATES PATENT OFFICE 1,925,937

PIPE COUPLING

Charles F. Schultis, Cleveland, Ohio, assignor of one-fourth to Samuel W. Goldman, and one-fourth to Isadore Herzbrun, both of Cleveland, Ohio Application December 9, 1930. Serial No. 501,061

5 Claims. (Cl. 285—120)

The present invention relates to improvements in couplings of the type used for copper or brass tubing and has for its object to provide a coupling which is capable of withstanding the effects of continual vibration.

Where tubing of the character referred to is employed, for conducting oil, liquid, fuel or other fluid in machines of various types and where the tubing is connected to parts which are subjected continuously to vibrations during the operation of the machine, leaks are likely to develop in the line due either to the loosening of the threaded coupling members by the vibrations, or due to the cracking of the tubing adjacent the end thereof which is clamped by the coupling members due to the continual vibration to which the tubing and coupling members are subjected. For example, leaks often develop in the oil and fuel lines of aeroplane engines, due either to loosening of the coupling members or breaks in the tubing caused by vibrations in the tubing and coupling members.

The present invention has for its object to provide a threaded coupling which will not be loosened by vibrations and further to provide a coupling which will prevent damage to the tube clamped therein by vibrations.

More specifically, it is an object of the present invention to provide a frictional locking means in connection with the coupling, which will serve to prevent loosening of the connection and which will not interfere with the tight clamping of the tubing in the coupling, and further to provide the coupling with means for effectively dampening vibrations in the tubing adjacent the end thereof clamped in the coupling to prevent cracking of the tubing adjacent the joint.

With the above and other objects in view, the invention may be said to comprise the coupling as illustrated in the accompanying drawing hereinafter described and particularly set forth in the appended claims, together with such variations and modifications thereof as will be apparent to one skilled in the art to which the invention appertains.

Reference should be had to the accompanying drawing forming a part of this specification in which.

Figure 2:
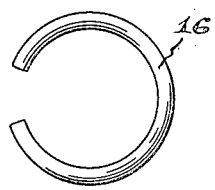
Fig. 2 is a plan view of the locking ring employed in the coupling.
Figure 1:
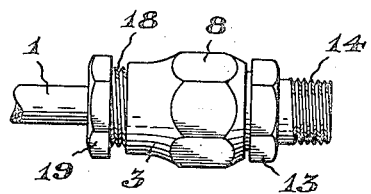
Figure 1 is a side elevation of a coupling embodying the invention.

In the accompanying drawing, the invention is illustrated as applied to a coupling of the type shown in my Patent Number 1,752,508, granted April 1, 1930. The coupling is shown applied to a section of tubing 1, which is formed of copper, brass, or other metal of relatively low ductility and which is provided at the end with a reversely curved flange 2 which may be formed by the method disclosed in the patent above referred to.

The main coupling member is designated by the reference numeral 3 and is provided with an axial bore 4 which is preferably of a diameter somewhat greater than the external diameter of the tube 1. The coupling member 3 is provided with internally threaded counter bores 5 and 6 at the opposite ends thereof and with an annular seating rib 7 at the bottom of the counter bore 5 which is of a form to fit against the inner face of the flange 2 and which serves to center the tube 1 in the axial bore 4 of the coupling member 3 and support the body portion of the tube out of contact with the wall of the coupling member.

The coupling member 3 is preferably provided with an enlarged portion 8 of hexagonal form adapted to receive a wrench. A co-operating coupling member 9 is provided with a threaded end 10 adapted to be screwed into the threaded counter bore 5 of the main coupling member. The coupling member 9 has an axial bore which is preferably of substantially the same diameter as the interior of the tube 1 and is provided at the end thereof with a concave annular seat 11 which conforms to the outer face of the flange 2. The coupling member 9 is provided with an enlarged hexagonal central portion 13 to receive a wrench by which the coupling member may be screwed into the main coupling member 3 to clamp the flange 2 of the tubing between the seats 7 and 11. The coupling member 9 may be threaded at the end opposite the threaded end 10 to provide a nipple 14 for engagement with a second coupling or with a part of the machine to which the tubing is attached.

Figure 3:
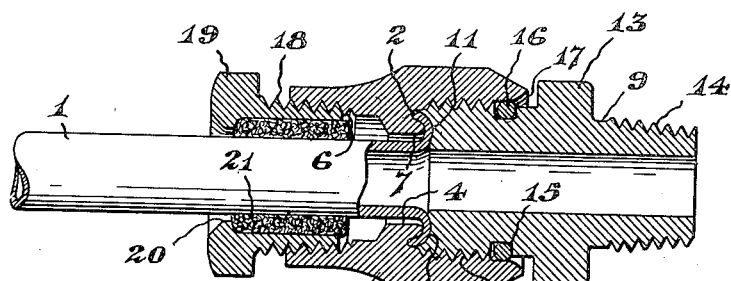
Fig. 3 is an axial section through the coupling.
Figure 4:
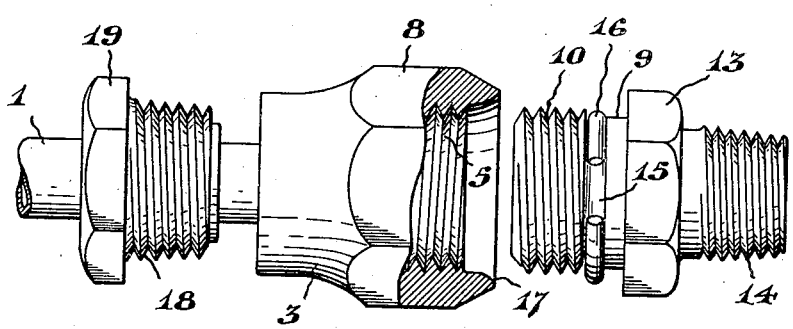
Fig. 4 is a side elevation showing the coupling with the parts thereof separated.

As shown in Figs. 3 and 4 of the drawing, the coupling member 9 is provided with a circumferential groove 15 at the inner end of the threaded portion 10, and in this groove, there is mounted a resilient split ring 16, the internal diameter of which is normally somewhat greater than the diameter of the bottom of the groove 15, so that the ring is supported loosely in the groove. The counter bore 5 of the main coupling member 3 is provided with a flaring outer end 17 within which the ring 16 engages as the threaded end 10 of the coupling member is screwed into the counter bore 5 and which serves to contract the ring into engagement with the bottom of the groove 15 whereby the ring provides a frictional interlock between the coupling member 9 and the coupling member 3, which will prevent loosening of the coupling members by vibration. Between the outer end of the thread of the counter bore 5 and the flaring end portion 17, the interior of the coupling member 5 is substantially cylindrical so that the coupling member 9 can be screwed as tightly as desired against the flange 2 and the ring 16 will not prevent the necessary inward movement of the coupling member 9.

The threaded counter bore 6 of the main coupling member 3 receives a threaded sleeve 18 which is provided with an enlarged hexagonal end portion 19 adapted to receive a wrench, so that the sleeve may be screwed into the coupling member. The sleeve 18 is provided with an inwardly projecting flange 20 at its outer end, which engages the outer end of a cushioning sleeve 21, which fits between the exterior of the tube 1 and the interior of the sleeve 18. The cushioning sleeve 21 may be composed of a suitable yielding substance such as fibrous packing material and provides a yielding support for the tubing 1 outwardly of the flange 2. The flange 2 of the tube 1 is clamped by means of the coacting coupling members 3 and 9 between the seats 7 and 11 which grip the flange 2 outwardly of the body of the tubing. The cushioning sleeve 21 serves to dampen vibrations in the tube 1 and prevent deterioration of the tubing adjacent the flange due to vibrations imparted thereto by the engine or other machinery to which the tube may be attached.

Figure 5:
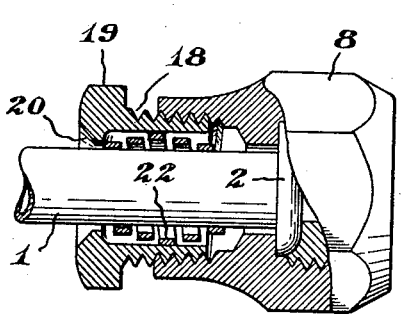
Fig. 5 is a sectional view showing a modified form of cushioning device, or vibration dampener for the tubing.

In Fig. 5 of the drawing, there is shown a modified form of cushioning device which may be substituted for the packing sleeve 21. In Fig. 5, the packing sleeve 21 is replaced by a cushioning device in the form of a coil spring 22, the end coils of which snugly engage the tube 1 and the center coil of which is of greater diameter and presses outwardly against the interior of the sleeve 18. In both instances, the cushioning device permits a limited lateral movement of the tube 1 and the coupling members and acts to dampen vibrations set up in the body of the tubing. The body of the tube 1 is supported out of contact with the wall of the coupling member 3 by the flange 2 which is gripped by the coupling members outwardly of the body of the tube, the flange providing a resilient support which will allow the tube to have vibratory movements without setting up localized bending stresses tending to rupture the tubing.

It will be apparent that the present invention provides a very simple and effective coupling which will remain tight and in which the tubing will not be injured by vibration.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A pipe coupling comprising a pair of tubular coupling members having opposed tube clamping seats, one of said members being externally threaded at one end and having a circumferential groove adjacent the inner end of the threaded portion and a resilient contractible ring mounted in the groove, the other of said members having a bore of a diameter to receive the threaded portion of the first coupling, a portion of said bore having internal threads for engagement with the threads of the first coupling member, said bore having a flaring inwardly tapering outer end into which said ring enters and by which the ring is contracted into said groove as the coupling members are screwed together.

2. A pipe coupling comprising a pair of tubular coupling members having opposed tube clamping seats, one of said members being externally threaded at one end and having a circumferential groove adjacent the inner end of the threaded portion and a resilient contractible ring mounted in the groove, the other of said members having a bore of a diameter to receive the threaded portion of the first coupling, a portion of said bore being threaded to receive the said threaded portion, said bore having a cylindrical portion outwardly of the threaded portion thereof of a diameter greater than the threaded portion and less than the normal external diameter of the ring, the outer end of said bore being flared outwardly to a diameter sufficient to receive said ring, whereby said ring enters into the flaring end portion as the coupling members are screwed together and is contracted into said groove.

3. In a pipe coupling, a tubular coupling member having an internally threaded bore, a sleeve screwed into said bore, a tube of an external diameter less than the internal diameter of the sleeve extending through said sleeve into the coupling member, means beyond the inner end of the sleeve for clamping the end of the tube in the coupling member and for holding the tube centrally of the sleeve out of contact therewith, and means for yieldably supporting the tube including a yielding cushion interposed between the exterior of the tube and the interior of the sleeve.

4. In a pipe coupling, a tubular coupling member having an internally threaded bore, a sleeve screwed into said bore, a tube of an external diameter less than the internal diameter of the sleeve extending through said sleeve into the coupling member, means beyond the inner end of the sleeve for clamping the end of the tube in the coupling member and for holding the tube centrally of the sleeve out of contact therewith, and means for yieldably supporting the tube including a yielding cushion comprising a packing ring spaced from the end of the tube and interposed between the exterior of said tube and the interior of said sleeve.

5. The combination with a tube having a continuous outwardly extending reversely curved flange at one end, of a coupling member having a bore of an internal diameter greater than the tube, said coupling member having an internal seat engageable with the inner face of said flange, means for clamping said flange against said seat, a sleeve surrounding the tube and secured in an end of said coupling member, and a yieldable cushion for the tube comprising a packing ring interposed between said sleeve and tube.

CHARLES F. SCHULTIS.